United States Patent [19]

Stoltenberg

[11] Patent Number: 4,739,787

[45] Date of Patent: Apr. 26, 1988

[54] METHOD AND APPARATUS FOR IMPROVING THE YIELD OF INTEGRATED CIRCUIT DEVICES

[76] Inventor: Kevin J. Stoltenberg, 8090 - 205th St. East, Hastings, Minn. 55033

[21] Appl. No.: 928,509

[22] Filed: Nov. 10, 1986

[51] Int. Cl.⁴ ............................................. G05D 16/00
[52] U.S. Cl. .................................. 137/14; 137/624.11; 137/624.18; 137/487.5
[58] Field of Search ........... 137/487.5, 624.11, 624.18, 137/624.2, 14

[56] References Cited

U.S. PATENT DOCUMENTS 3,429,336  2/1969  Moriyama ................. 137/624.11 X
4,054,151 10/1977  Parker ........................ 137/487.5 X
4,394,871  7/1983  Czajka ......................... 137/487.5 X Primary Examiner—Alan Cohan
Attorney, Agent, or Firm—Orrin M. Haugen; Thomas J. Nikolai; Frederick W. Niebuhr

[57] ABSTRACT

A method and apparatus for reducing the incidence of product contamination during processing of the product in a vacuum chamber. By providing soft-start valves in the vacuum and vent lines, and by properly driving said soft-start valves, it is possible to reduce the gas flow rates from and into the vacuum chamber to such a low level, that dust-like particles remaining in the chamber from prior product processing steps is not disturbed and allowed to settle upon the product then being treated.

8 Claims, 3 Drawing Sheets

METHOD AND APPARATUS FOR IMPROVING THE YIELD OF INTEGRATED CIRCUIT DEVICES

BACKGROUND OF THE INVENTION

I. Field of the Invention:

This invention relates generally to a method and apparatus for processing materials, such as semiconductor devices in a vacuum environment, and more particularly to an improved processing method and apparatus whereby low yields due to contamination are overcome.

II. Discussion of the Prior Art:

In fabricating integrated circuit chips, a wafer of semiconductor materials, such as silicon or gallium arsonide, are subjected to a sequential series of processing steps, including oxidation, dopant diffusion by ion implantation, masking and etching, metal depositions, further depositions of insulating materials, such as silicon oxide, in the formation of various junctions and interconnects including terminal pads and the like. The silicon wafer is then tested and ultimately sliced into discrete integrated circuit chips before the chips are individually encased in a suitable package. The aforementioned steps of metallization, passivation, etc., must be carried out in an extremely clean environment. Semiconductor production facilities commonly include so-called "clean rooms" in which the room air is filtered and exchanged at high flow rates and workers are gowned in relatively dust-free clothing. These ultra-clean production environments are mandated when it is considered that even the tiniest of foreign contaminants can result in a defective semiconductor device.

As indicated above, various metallization and passivation steps performed on the silicon wafers are carried out in a vacuum using vacuum deposition and vacuum sputtering techniques. Typically, during a metallization step, one or more semiconductor wafers are placed in a vacuum chamber which may be pumped down to a pressure of $-5 \times 10^{-6}$ torr and then the metal, typically aluminum, contained in a fixture is exposed to a high energy electron beam and caused to vaporize. The vapors are allowed to condense on the silicon substrate, and then the metal layer is later etched, in the vacuum chamber by a reactive sputtering process or otherwise, in accordance with a predetermined pattern defined by a photoresist layer which has been exposed to light through one or more masks. More than one such metallization step is usually required.

In a subsequent step, the metallized and etched wafer may be placed in still another vacuum chamber in which silicon oxide (glass) is deposited so as to create an insulating passivation layer.

A typical vacuum system to provide a local gaseous environment for use in semiconductor manufacture would typically include a process chamber having entrance and exit locks, a vacuum pump providing a means for evacuating the gaseous content of the process chamber as well as the load lock and exit lock thereto, an on/off vent valve which allows control of the vacuum displacement with a desired gas and also a on/off vacuum valve for controlling the evacuation of the process chamber by means of the vacuum pump.

The standard operation of the vacuum valve and the vent valve in a typical prior art vacuum deposition system creates a pressure "burst" when either pumping the system to a predetermined vacuum or when venting the system to atmosphere, such as occurs prior to the loading and unloading of products into and from the vacuum chamber. I have found that this pressure burst will disturb and redistribute contamination that resides within the process chamber. The contamination typically comprises minute, microscopic particles which have remained in the processing chamber following previous runs of product through that chamber. For example, after only a few cycles of operation, the vacuum metallization chamber collects a residue of metal or metallic oxides which come to rest on the fixtures contained within the vacuum chamber. Similarly, in the glass passification step, minute particles of silicon oxide can collect on the surfaces of the vacuum chamber used for that operation, later to become shaken free due to the rush or burst of gas movement when the pressure in the chamber or the locks leading thereto is suddenly changed. This redistribution of contamination can and often does result in decreased process and product yield, which, in turn, reflects a loss of profit dollars.

OBJECTS

It is accordingly a principal object of the present invention to obviate the above-described shortcomings of the prior art vacuum based manufacturing processes.

Another object of the invention is to provide an apparatus and method for substantially eliminating redistribution of contaminants within a vacuum processing chamber during the pump-down and subsequent venting of that chamber.

Yet another object of the invention is to provide a method and apparatus for improving the yield of product produced using vacuum processing techniques.

A still further object of the invention is to provide a cost-effective device to eliminate pressure bursts from defect-sensitive processing of workpieces, such as semiconductor wafers, in a vacuum environment.

SUMMARY OF THE INVENTION

A conventional vacuum processing system includes a system chamber having a load door through which product to be treated may be inserted and removed. The door is surrounded by a gastight seal. Suitable tubes or lines are provided for coupling the processing chamber to a vacuum pumping station and a main vacuum gate valve is disposed in that line so that once the chamber is pumped down to a suitable negative pressure, the valve can be closed to retain that pressure. At other times, this valve may also be left open during some processes to allow continued flow across the product. A vent line having a vent valve disposed therein joins the system vacuum chamber to a source of suitable vent gas so that, following the completion of the processing step within the vacuum chamber, that vent valve may be opened to allow the vent gas to be drawn into the evacuated system chamber to restore the interior of the chamber to atmospheric pressure.

In accordance with the present invention, there is placed in parallel with the main vacuum gate valve, a motor-driven, variable-orifice valve such as a needle valve. The motor is controlled by an electronic circuit so that it can be made to open and close in accordance with a predetermined time profile. For example, the drive motor control circuit may provide an adjustable "turn-on" ramp as well as an adjustable total flow "setpoint". Those valves in the system of the present invention, which are designed to go from a closed flow condition to an open flow condition over a predetermined time interval, will be referred to herein as "soft-start valves" or by the acronym "SSV".

When it is desired to evacuate the system, the main vacuum gate valve is originally closed, as in the SSV. If the SSV does not possess a positive shut-off characteristic, it is expedient to use a positive shut-off valve in series with it. Valves having a positive shutoff capability are commercially available. The control signal commanding the vacuum gate valve to open so as to expose the interior of the processing chamber to the continuously running vacuum pump is delayed while the series shut-off valve, if used, is immediately driven to its opened condition. The SSV will begin to slowly "ramp" open at the preselected rate and to the preselected set-point. Only after this set-point is reached will the vacuum gate valve respond to the delayed command signal. Thus, the interior of the processing chamber is not instantaneously exposed to a maximum negative pressure which would otherwise tend to cause the contaminants contained therein to be disturbed and redistributed. When the main vacuum gate valve is commanded to close, both the SSV and the optional shut-off valve may be simultaneously closed or, alternatively, the SSV may also be allowed to close in a slow "ramped" mode followed by the delayed closure of the series shut-off valve.

In applying the present invention to the vent side of the processing chamber, an SSV is placed directly in series with the main vent valve and is arranged to be closed whenever the main vent valve is closed. The main vent valve can also be totally eliminated from the system if the particular SSV selected has a positive shut-off capability. However, assuming that the SSV does not have a positive shut-off capability and is in series with the main vent valve, when the main vent valve is commanded to open, the SSV does not open instantaneously, but instead opens in accordance with the ramp-up profile established by its associated motor control circuit. As such, a sudden rush or burst of vent gas into the processing chamber is avoided. When the main vent valve is commanded to close, the SSV under control of the motor control will close with a predetermined "ramp" and then will give the series valve a delayed close signal. Thus, the vent gas used to bring the interior of the vacuum chamber up to atmospheric pressure is introduced and stopped at a slow, programmed rate and, as such, does not tend to blast debris contained within the vacuum chamber loose, allowing it to settle upon the workpiece being processed in the vacuum chamber.

The foregoing advantages, features and objects of the invention will become apparent to those skilled in the art from the following detailed description of a preferred embodiment, especially when considered in conjunction with the accompanying drawings.

DESCRIPTION OF THE PREFERRED EMBODIMENT

There are typically three chip failure modes associated with contamination:

1. Short circuits caused by "bridging" of circuit features.

2. Open circuits caused by "masking" of circuit features.

3. Lifetime failures caused by "partial" opens and shorts that mature as a result of electrical, mechanical or temperature stresses.

Figure 1:
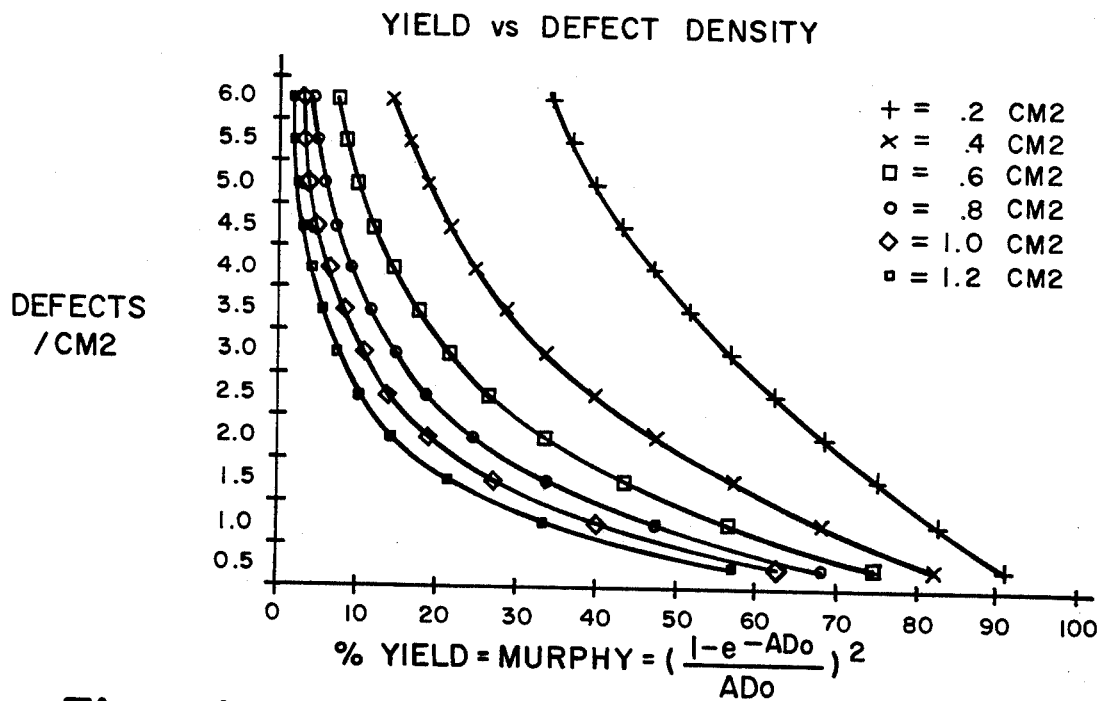
FIG. 1 is a family of curves showing the manner in which the yield of satisfactory integrated circuit chips varies as a function of defect density.

Referring to FIG. 1, there is plotted a family of curves in accordance with the well-accepted Murphy yield model reflecting, for the semiconductor industry generally, the yield of acceptable chips as a function of the number of defects per square centimeter for chips of varying size. These curves reveal that for any type of flaw or contamination large enough to cause an "open" or "short" in the circuit, as the number per square centimeter increases, the yield of operational chips decreases quite rapidly toward zero. The yield graph shows decreasing yields for increasing die area. This is due to the fact that as chip area increases, the probability of including a defect into that area increases. An additional impact on yield is that as geometrics shrink, probability of a given contaminate size causing a failure increases as well.

Thus, it is apparent that, to increase the yield of usable product, it is imperative that the incidences of defects due to contamination should be kept to an absolute minimum. As already pointed out in the introductory portion of this specification, I have found that one commonly overlooked source of contamination is the debris remaining within the vacuum chamber following its use for the batch or serial processing of semiconductor wafers. A typical vacuum system used in processing semiconductor wafers in the formation of integrated circuits is illustrated schematically in FIG. 2. Here, the system is indicated generally by numeral 10 and is seen to include a vacuum chamber 12 having an access door 14 for allowing workpieces to be inserted and removed. A vacuum line 16 leading to a continuously-running vacuum pump 17 is joined to the vacuum chamber 12, and disposed in the line 16 is a vacuum gate valve $V_3$. This valve is typically an air-operated valve that, upon receipt of an electrical on/off signal, assumes a full media-passing or a full media-blocking position. The term "media" is intended to include gases as well as gases containing solid particles.

A typical prior art vacuum processing system also includes a vent line 18, which is arranged to be coupled to a source of vent gas (not shown) and which leads to the vacuum chamber 12. Disposed in series with the line 18 is a pressure regulator 20 and a vent valve $V_1$, the latter typically being an air-operated bang-open/bang-close type of valve and is actuated by an electrical on/off "vent" command originating at the system process controller (not shown).

With regard to the vacuum processing system thus far described, when it is desired to perform a process step in vacuum, the door 14 to the vacuum chamber 12 is open and the workpiece is situably positioned in a holding fixture contained within the vacuum chamber. The door is then reclosed and sealed. The vent valve $V_1$ at this time is closed and, when the vacuum valve $V_3$ is commanded to open by an electrical signal from the system process controller, the valve $V_3$ opens relatively instantaneously exposing the interior of the vacuum chamber to the negative pressure provided by the vacuum pump 17 joined to the vacuum line 16. This sudden application of a negative pressure has been found to disturb particulate matter residing within the interior of the vacuum chamber 12 from previous processing cycles and this debris can settle upon the workpiece to be treated, resulting in its contamination.

Once the processing step has been completed, the valve $V_3$ is "bang" closed while the vent valve $V_1$ is commanded to "bang" open. The sudden exposure of the interior of the vacuum chamber 12 to atmospheric pressure is, of course, accompanied by an in-rush of vent gas which typically might be nigrogen, argon or helium depending upon the nature of the manufacturing process being effected. This in-rush of gas into the vacuum chamber 12 tends to again shake minute particles of foreign materials loose from the interior walls and surfaces of the chamber 12 itself, as well as from the fixtures which may be contained therein. This foreign matter routinely settles upon the workpiece prior to its removal from the chamber 12 via the chamber's entry/exit door 14.

Figure 3:
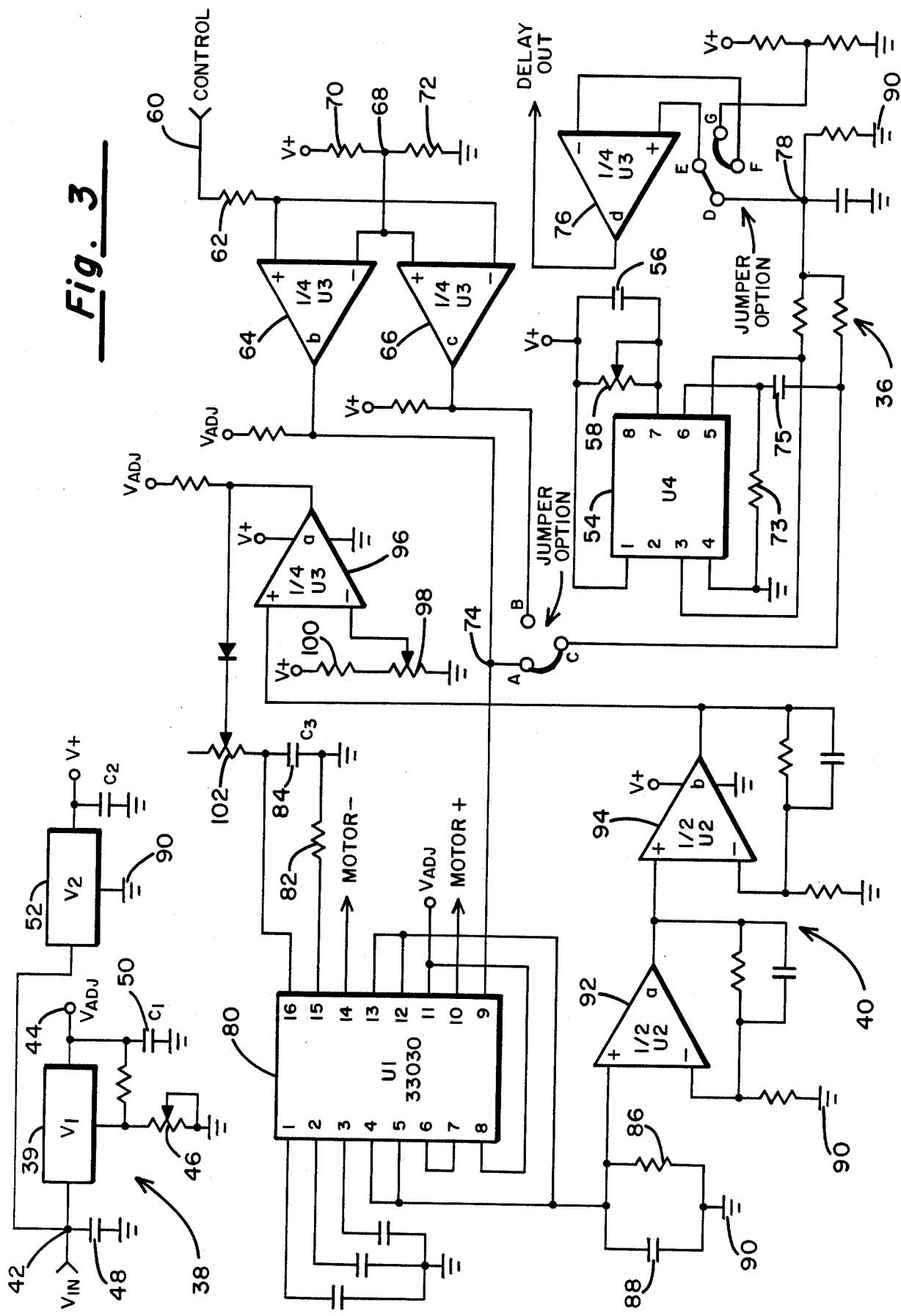
FIG. 3 is a block diagram of the motor control circuit shown in the drawing of FIG. 1.
Figure 4A:
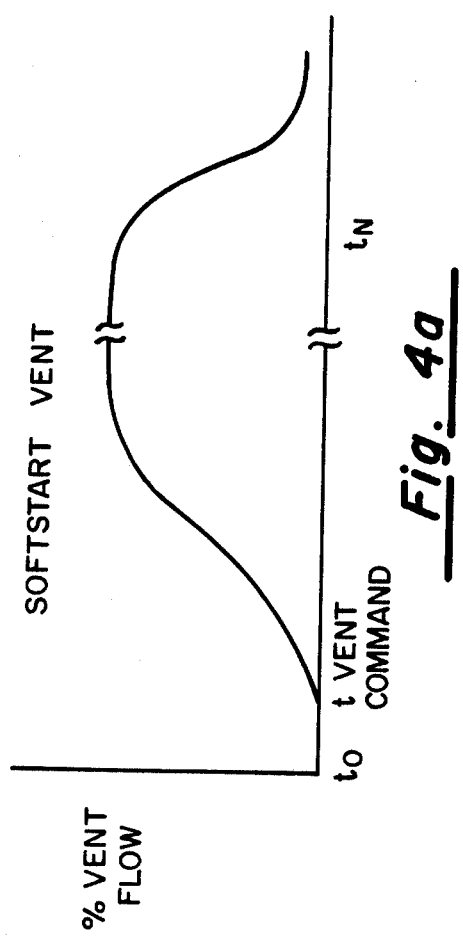
FIGS. 4(a) and 4(b) show the comparative flow profiles of the vent valve operations when the present invention is used and not used, respectively.
Figure 5A:
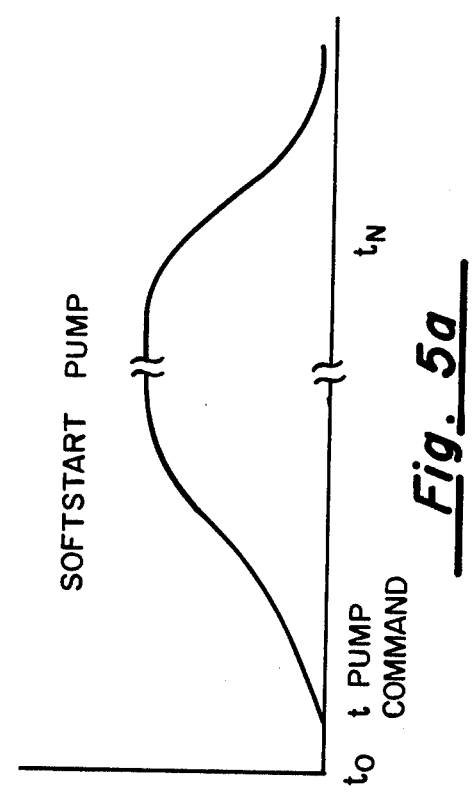
FIGS. 5(a) and 5(b) show the comparable flow profiles as those in FIGS. 4(a) and 4(b) for the vacuum side of the system.
Figure 4B:
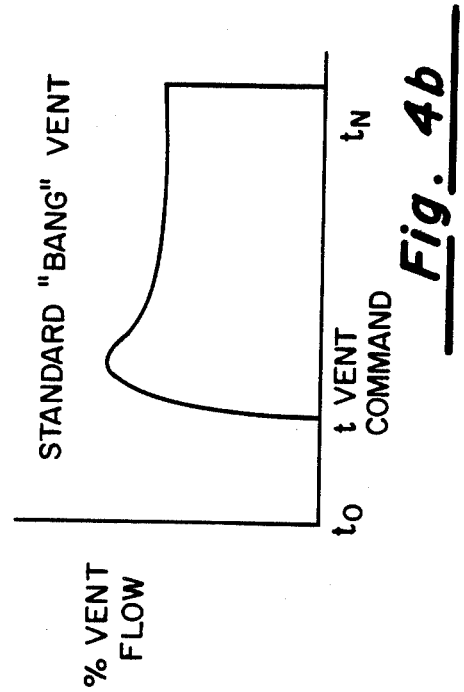
Figure 5B:
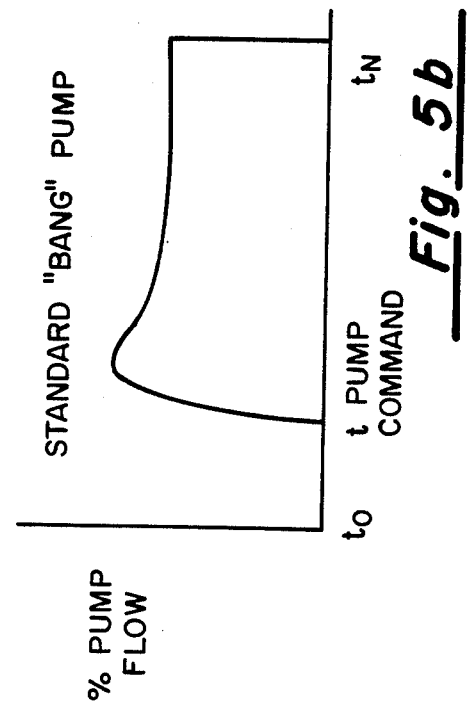

To obviate this problem and to thereby increase the yield of usable product resulting from the vacuum processing operations, I have added to the prior art system described above the apparatus shown as being enclosed by the broken line boxes 22 and 24. As is illustrated, there is provided a by-pass line 26 connected in parallel with the bang open-bang close vacuum valve $V_3$ and included in the branch 26 is a soft-start, motor-operated variable orifice valve $SSV_4$. Also shown enclosed by the broken line box 22 is a motor 28 whose shaft is suitably coupled to the valve $SSV_4$, the motor being controlled by a control circuit 29, the particulars of which will be described hereinbelow in connection with FIG. 3. In implementing the invention, I have used a Type 1624 Micro-Mo motor whose shaft is coupled to the variable orifice valve $SSV_4$. A valve suitable for use in this application may be a Nupro Type SS-4BMG although other models also available from Nupro may be used as well and may include a positive shut-off capability. The motor control circuits 29 and 30 are each arranged to provide a predetermined flow versus time profile through the valves $SSV_2$ and $SSV_4$. In this regard, reference is now made to FIG. 3 which shows a schematic diagram of the motor control circuits.

Figure 2:
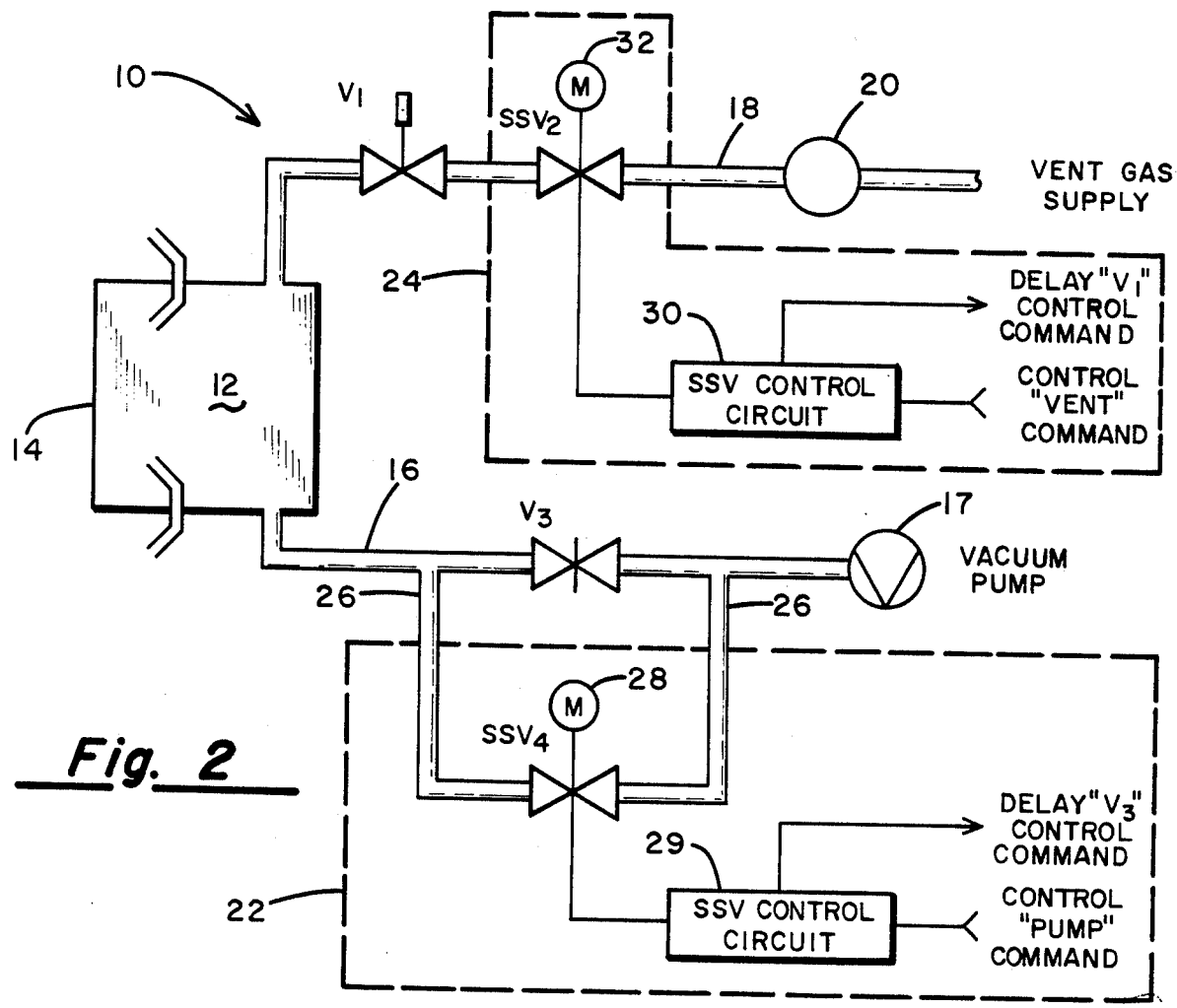
FIG. 2 is a schematic diagram of a vacuum processing system incorporating the present invention.

Each of the motor control circuits 29 and 30 used in the system of FIG. 2 can be considered as comprised of two major subassemblies, namely, a voltage regulator circuit 38 and a dc servo motor controller/driver circuit 40. A one-shot based time delay circuit 36 is also utilized with the vent valve $V_1$ and the vacuum valves $V_3$ shown in FIG. 2.

The voltage regulator 38 is illustrated as a solid-state, three-terminal device, and preferably may be a Type LM317 integrated circuit voltage regulator chip 39 which receives an unregulated DC voltage at its input terminal 42 and produces a steady, regulated voltage at its output terminal 44, the magnitude of which can be set by potentiometer 46. Capacitors 48 and 50 provide ripple filtering.

The signal $V_{adj}$ appearing at terminal 44 is, in turn, supplied to the servo motor controller driver 40 in a manner yet to be described. The voltage regulator circuit 38 also includes a second three-terminal integrated circuit regulator chip 52 for providing a steady, well-regulated direct current bias signal $V+$ which, too, is utilized by the servo motor controller driver circuit 40 and the delay circuit 38. To eliminate unnecessary lines in the drawings, the conductors connecting the output from the voltage regulators 39 and 52 to the remainder of the circuit have been eliminated, it being understood that the terminals of the circuit labeled $V_{adj}$ and $V_+$ are connected to the correspondingly labeled terminals of the voltage regulators 39 and 52.

The time delay circuit 36 includes a precision timer integrated circuit 54 which may, for example, be a Type ICM7242, which is configured as a one-shot circuit. Coupled between the voltage reference source $V_+$ and pins 7 and 1 thereof is a RC timing circuit including capacitor 56 and a variable resistor 58 which together determine the delay period of the precision timer.

The trigger signal for the timer is derived from the "Valve Open" or the "Valve Close" control signal applied to input 60 from the system control panel (not shown). This signal is a binary "Hi" on the "Open" command and a binary "Lo" for the "Close" command. In either event, it is coupled through a current limiting resistor 62 to the non-inverting input of an op amp buffer inverter 64 and to the inverting input of a similar op amp inverting buffer 66. A source of reference potential is applied to the remaining inputs of each of these buffers from the center terminal 68 of a resistive voltage divider including the series resistors 70 and 72 connected between $V_+$ and ground. The output from the two buffer inverters 64 and 66 are wire OR'ed together at 74, such that on either command, a binary Hi signal results and when the jumper is connected between terminals A and C as shown, this Hi input is capable of triggering the delay one-shot comprised of the IC timer 54 and its associated RC timing network which includes the resistor 73 and the capacitor 75. The output on pin 3 of circuit 54 is normally Hi and goes Lo for the period of the timer established by the RC components 56 and 58.

A further inverter 76 having an open collector output to accommodate a range of logic voltage levels and a jumper selectable option feature allows the "Delay Out" signal to be selectively either a Hi or Lo condition to accomodate the downstream logic. More particularly, the output from pin 3 is resistor AND'ed at 78 with the trigger signal and, when the jumpers are connected as shown, the delay output signal will be Hi whereas if the jumpers are reversed, the Delay Out will be Lo.

The Value Open/Value Close commands, irrespective of polarity, appear at junction 74 and are applied to a dc servo motor controller chip 80 which preferably is a Motorola Type MC33030 device. It is a dc servo motor controller designed to provide all active functions necessary for a complete, closedloop system. As is pointed out in the Motorola Corporation Advance Information publication ADI 1154R1, the MC 33030 dc servo motor controller provides all of the active functions necessary for a complete, closed-loop system. The device consists of an on-chip operational amplifier and window comparator with wide input common-mode range, drive and brake logic with direction memory, power H switch driver capable of handling 1.0 ampere, independently programmable over-current monitor and shut-down delay, as well as an over-voltage monitor. The over-current monitor is designed to distinguish between motor start-up and a locked motor condition that occurs when the actuator being driven by the motor reaches a travel limit. A fraction of the power H-switch source current is internally fed into one of the two inverting inputs of the current comparator, while the non-inverting input of the comparator is driven by a programmable current reference. The reference level is controlled by the component values of the resistor 82 connected to the $R_{oc}$ input pin (pin 15) of the MC 33030 IC chip. During an over-current condition, the comparator will turn off and allow the current source to charge the delay capacitor 84. When the charge across capacitor 84 reaches approximately 7.5 volts, the set input of an over-current latch contained within the IC chip goes high, disabling the drive and brake functions of the power H-switch. Thus, when the motor control valve $SSV_4$ or $SSV_2$ is to be driven open, the motor 28 or 32 is driven until the valve stem reaches its travel limit to the full-open position and, as the motor attempts to drive it further, its shaft stalls, creating the over-current condition which results in the drive being removed from the motor. Similarly, when the valve is being driven from a full open to a full closed position, the over-current condition arises when the valve becomes fully seated.

Because the Type 33030 integrated circuit chip normally responds to overcurrent conditions in the 100 milliamp range and because the motors used with the valves in the present invention do not draw stalled rotor currents in this high of a range, the chip has been adapted to the particular application by including the parallel combination of resistor 86 and capacitor 88 which is connected between system ground identified by the symbol 90 and the GND pins 4, 5, 12 and 13 of the device 80. The voltage developed across the RC circuit is amplified by cascaded amplifier stages 92 and 94 and the resulting amplified output is applied to the noninverting input of an op amp comparator 96. The threshold for the op amp 96 is set by the potentiometer 98 which is connected in series with a fixed resistor 100 between the reference source V+ and ground. When the amplified signal derived from the RC circuit 88 exceeds the threshold established for the comparator 96, the capacitor 84 will begin to charge and when the voltage across the capacitor reaches the 7.5 volt threshold associated with the controller/driver chip 80, the drive will be removed from the motor terminal pins 10 and 14. The potentiometer 102 allows the response time of the over-current sensing to be varied.

Having described the physical or structural aspects of the preferred embodiment, attention will next be given to its mode of operation.

OPERATION

At the start of a vacuum processing operation, the interior of the vacuum chamber 12 will be at atmospheric pressure and the door 14 may be opened to insert the device to be worked upon. When the door 14 is closed and sealed, the vent valve $V_1$ and the soft-start valve $SSV_2$ in the vent line 18 will be closed. Furthermore, the main vacuum valve $V_3$ as well as the soft-start valve $SSV_4$ will also be closed. Upon receipt of the "PUMP" control command from the system control panel (not shown), the signal to the motor control circuit 29 causes the motor 28 to open the valve $SSV_4$ in accordance with the flow versus time profile curve as previously explained. Because of the time delay circuit 36 embodied in the SSV control circuit 29, the main vacuum gate valve $V_3$ does not open until the ramp-up period of the soft-start valve $SSV_4$ has ended and it is fully opened. It can be seen, then, that the interior of the vacuum chamber 12 will not instantaneously be subjected to the full negative pressure of the vacuum source, but instead, will slowly draw the gas contained within it through the vacuum line 16, via the by-pass line 26 to the continuously running vacuum pumping station.

When the signal from the system control panel commands the vacuum gate valve $V_3$ to close, it closes immediately, while the motor 28, under control of the motor control circuit 29, will again drive the valve $SSV_4$ to its closed condition in accordance with a predetermined ramp-closed profile. If the valve $SSV_4$ does not have a positive shut-off capability, an air or solenoid operated bang open/bang close valve can be placed in series with the valve $SSV_4$ but caused to open or close as the case may be only after the delay period has elapsed.

In a typical vent phase of operation, an electrical signal from the process control panel is used to command the main vent valve $V_1$ to open. This same signal is applied to the motor control circuit 30 and it begins to function so as to apply a ramp voltage to the motor 32 such that the soft-start valve $SSV_2$ will be driven open to its predetermined set-point flow condition over a predetermined time span. As such, the vent gas from the vent gas supply (not shown) is allowed to flow into the vacuum chamber 12 in accordance with the profile established by $SSV_2$. This reduces or eliminates the shock which would otherwise be experienced within the vacuum chamber if a full in-rush of vent gas were permitted to flow through the system's main vent valve $V_1$.

It can thus be seen that there is provided by this invention a control mechanism for the vacuum processing chamber 12 whereby sudden pressure bursts within the chamber are avoided during the pump-down and venting cycles. This has been found to markedly reduce the incidents of defects in the workpieces being processed and does not materially increase the amount of time required to complete the processing operation.

Those skilled in the art will recognize that various changes and modifications may be made to the preferred embodiment described herein. For example, it is recognized that if the vent valve $V_1$ were itself a variable orifice valve, such as a needle valve, a ball valve, a butterfly valve, or a gate valve, it could be directly operated by a motor in the same fashion that the valve $SSV_2$ is made to operate. This would eliminate the need for a separate, series-connected, soft-start valve. However, since all of the prior art systems of which I am aware incorporate an air-operated "bang" valve $V_4$ in the vent line 18, it has been found more convenient to add a separate soft-start valve in series with it.

Another alternative is to insert the soft-start valve $SSV_4$ in series with the vacuum valve $V_3$ rather than in parallel as shown. Then, in response to the "pump" command, the gate valve $V_3$ opens immediately while the valve $SSV_4$ slowly opens in accordance with a predetermined time profile. When shutting off the line to the vacuum pump 17, the valve $SSV_1$ is driven closed slowly, followed by the closure of the gate valve $V_3$ after a predetermined time delay established by delay circuit 36. If the valve $SSV_4$ has a positive shut-off capability and can be fully opened and fully closed in accordance with the programmed rate, then the gate valve V₃ could also be eliminated.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A method of treating workpieces in a vacuum environment comprising the steps of:
   (a) inserting the workpieces into an evacuable chamber;
   (b) exposing the interior of said chamber to a predetermined negative pressure in accordance with a first preprogrammed time profile;
   (c) performing a process step on said workpieces; and
   (d) returning the interior of said chamber to atmospheric pressure in accordance with a second predetermined time profile prior to the removal of said workpieces from said chamber, said first and second time profiles being sufficiently long to avoid gas flow turbulence in said chamber which can disturb particle matter within said chamber.

2. In a vacuum processing system of the type including a vacuum chamber in which one or more manufacturing processes are to be carried out on a workpiece under vacuum conditions and which may contain particulate debris as a by-product of said processes, a vacuum pumping station for creating a predetermined negative pressure, a vacuum line including an on/off vacuum valve coupling said vacuum pumping station to said vacuum chamber, a source of vent gas at a predetermined positive pressure, a vent line including an on/off vent valve coupling said source of vent gas to said vacuum chamber, the improvement comprising:
   (a) a variable orifice valve connected in series flow relation with said vent valve;
   (b) motor means operatively coupled to said variable orifice valve; and
   (c) motor control means responsive to an electrical command signal for driving said motor means so as to initiate flow of vent gas from said source into said vacuum chamber in accordance with a flow versus time profile which limits flow turbulence to a level precluding disturbance of particulate debris within said chamber.

3. The vacuum processing station as in claim 2 wherein said predetermined flow versus time profile is a ramp having a positive slope which is sufficiently long so as to avoid a rapid in-rush of vent gas into said vacuum chamber which might otherwise dislodge particulate debris present within said vacuum chamber.

4. In a vacuum processing system of the type including a vacuum chamber in which one or more manufacturing processes are to be carried out on a workpiece under vacuum conditions and which may contain particulate debris as a by-product of said processes, a vacuum pumping station for creating a predetermined negative pressure, a vacuum line including an on/off vacuum valve coupling said vacuum pumping station to said vacuum chamber, a source of vent gas at a predetermined positive pressure, a vent line including an on/off vent valve coupling said source of vent gas to said vacuum chamber, the improvement comprising:
   (a) a variable orifice valve connected in parallel flow relation with said vacuum valve;
   (b) motor means operatively coupled to said variable orifice valve for driving said valve abetween a fluid blocking and fluid passing position; and
   (c) motor control means responsive to an electrical command signal for driving said variable orifice valve between said fluid blocking and fluid passing positions in accordance with a predetermined flow versus time profile which limits gas flow turbulence to a level precluding disturbance of particulate debris within said chamber.

5. The vacuum processing station as in claim 4 wherein said vacuum valve is electrically actuatable between a fluid blocking and fluid passing state in response to said electrical command signal.

6. The vacuum processing station as in claim 5 and further including signal delay means coupled to delay the receipt of said electrical command signal by said vacuum valve for a period greater than said predetermined time profile.

7. The vacuum processing station as in claim 6 wherein said predetermined time profile is a ramp of a predetermined positive slope between a zero flow condition and a predetermined set-point flow condition.

8. In a vacuum processing system of the type including a vacuum chamber in which one or more manufacturing processes are to be carried out on a workpiece under vacuum conditions and which contains particulate debris as a by-product of said processes, a vacuum pumping station for creating a predetermined negative pressure, a vacuum line including an on/off vacuum valve coupling said vacuum pumping station to said vacuum chamber, a source of vent gas at a predetermined positive pressure, a vent line including an on/off vent valve coupling said source of vent gas to said vacuum chamber, the improvement comprising:
   (a) a first variable orifice valve connected in series flow relation with said vent valve;
   (b) motor means operatively coupled to said first variable orifice valve;
   (c) first motor control means responsive to an electrical command signal for driving said motor means so as to initiate flow of vent gas from said source into said vacuum chamber in accordance with a first predetermined flow versus time profile;
   (d) a second variable orifice valve connected in parallel flow relation with said vacuum valve;
   (e) further motor means operatively coupled to said second variable orifice valve for driving said second valve between a fluid blocking and fluid passing position; and
   (f) second motor control means responsive to an electrical command signal for driving said second variable orifice valve between said fluid blocking and fluid passing positions in accordance with a second predetermined flow versus time profile, said first and second flow versus time profiles being such that said particulate debris remains substantially undisturbed.

* * * * *